United States Patent
Brilmyer

(10) Patent No.: US 8,544,670 B2
(45) Date of Patent: Oct. 1, 2013

(54) FIRE CONTAINMENT CASE FOR PORTABLE BATTERY OPERATED ELECTRONIC DEVICES

(76) Inventor: George Howard Brilmyer, Johnson City, TN (US)

( * ) Notice: Subject to any disclaimer, the term of this patent is extended or adjusted under 35 U.S.C. 154(b) by 10 days.

(21) Appl. No.: 13/066,481

(22) Filed: Apr. 15, 2011

(65) Prior Publication Data

US 2013/0146603 A1 Jun. 13, 2013

Related U.S. Application Data

(60) Provisional application No. 61/342,472, filed on Apr. 15, 2010.

(51) Int. Cl.
*B65D 90/22* (2006.01)
(52) U.S. Cl.
USPC ............ 220/88.1; 220/560.01; 312/409; 109/33
(58) Field of Classification Search
USPC ............ 220/88.1, 560.01; 312/409; 109/33; 169/66
See application file for complete search history.

(56) References Cited

U.S. PATENT DOCUMENTS

| | | | | |
|---|---|---|---|---|
| 2,190,229 A | * | 2/1940 | Bradley | ............ 109/33 |
| 4,236,463 A | * | 12/1980 | Westcott | ............ 109/33 |
| 4,616,694 A | * | 10/1986 | Hsieh | ............ 165/47 |
| 4,685,402 A | * | 8/1987 | Nelson et al. | ............ 109/65 |
| 5,056,603 A | * | 10/1991 | Parkinson | ............ 169/48 |
| 5,069,358 A | * | 12/1991 | Avery, Jr. | ............ 220/560.01 |
| 5,868,709 A | * | 2/1999 | Champion et al. | ............ 604/110 |
| 5,891,223 A | | 4/1999 | Shaw et al. | |
| 6,158,833 A | | 12/2000 | Engler | |
| 7,051,872 B2 | * | 5/2006 | Bjerregaard et al. | ...... 206/308.1 |
| 7,070,003 B1 | * | 7/2006 | Smith | ............ 169/66 |
| 7,232,197 B2 | | 6/2007 | Davis | |
| 7,291,784 B2 | * | 11/2007 | Moore et al. | ............ 174/50 |
| 7,545,639 B2 | | 6/2009 | Ridge | |
| 7,843,689 B2 | * | 11/2010 | Moore et al. | ............ 361/690 |
| 2007/0000925 A1 | * | 1/2007 | Fortin | ............ 220/88.1 |
| 2007/0061598 A1 | * | 3/2007 | Bitton et al. | ............ 713/194 |
| 2008/0290094 A1 | | 11/2008 | Bruce | |
| 2009/0014188 A1 | | 1/2009 | Hesch et al. | |
| 2011/0019355 A1 | | 1/2011 | Cleveland | |

* cited by examiner

*Primary Examiner* — J. Gregory Pickett
*Assistant Examiner* — Blaine Neway
(74) *Attorney, Agent, or Firm* — Luedeka Neely Group, PC

(57) ABSTRACT

A case for portable laptop computers and the like including removed batteries to contain and control the bi-products of combustion associated with the unintentional and unexpected combustion of electronic component batteries typically occurring during the thermal runaway of the batteries. The fire containment case controls heat, flame and toxic gases associated therewith. The case has an airtight seal with integrated filters to trap and neutralize the smoke and gas released during combustion. A variety of heat insulation both active and passive can be used along with condition status instruments, and fire suppression can also be provided in core construction and external adaption input suppression inlets.

14 Claims, 4 Drawing Sheets

US 8,544,670 B2

FIRE CONTAINMENT CASE FOR PORTABLE BATTERY OPERATED ELECTRONIC DEVICES

This application claims the benefit of U.S. Provisional Application No. 61/342,472, filed Apr. 15, 2010.

1. TECHNICAL FIELD

This invention relates to heat and fire containment enclosures used to isolate a fire event in electrical equipment that may be subject to rapid intense combustion due to malfunction of the electrical system. Such portable equipment fires may be difficult to control and extinguish given the nature of the burning battery that burns at a high temperature with its own oxidation agent emitting nauseous fumes. Such fires cannot be easily extinguished and must typically be allowed to burn themselves out of their own accord.

2. DESCRIPTION OF PRIOR ART

Prior art devices of this type are typically directed to room or cabinet enclosures positioned around electronic equipment in case of fire. Such enclosures are primarily used to protect the equipment from fire rather than to contain and control the fire in the equipment. An example of a fireproof or resistant enclosure in a related venue would be a fireproof or resistant filing cabinet that will keep the contents of the cabinet safe from fire for a determined time period at a given maximum temperature. See for example U.S. Pat. Nos. 4,685,402, 6,158,833, 7,232,197, 7,545,639 and U.S. Publication 2009/0014188 A1.

U.S. Pat. No. 4,685,402 is directed to a fire resistant cabinet for storing easily damaged electronic data storage material which is essentially a safe like configuration having insulated interior sidewalls to resist fire from the outside, thus keeping the contents presumably safe.

U.S. Pat. No. 6,158,833 claims a fire resistant computer storage apparatus which is a thermally insulated cabinet providing protection for electronic data storage device from accidental and environmental conditions. The cabinet has multiple layers of fire resistant and heat dissipation insulation material to provide storage for data positioned within on electronic readable means.

U.S. Pat. No. 7,232,197 illustrates a fire safety electronic data storage protection device which is a cabinet to store electronic data such as zip drives or CD ROM storage and is of a fireproof configuration to prevent damage to the fire that would occur within the facility thus maintaining the integrity of backup copies stored within.

U.S. Pat. No. 7,545,639 is directed to a fireproof container with heat activated closure panel in which a heat sensitive activation panel is provided to automatically close over vent holes within the container restricting airflow therewithin. The container is designed to store hard drives and the like and upon exterior temperature reaching a predetermined condition will close sealing the fireproof container with its contents therewithin.

Finally in U.S. Patent Publication 2009/0014188 describes a device for containing ignited electrical equipment specifically electronic devices with lithium ion batteries. The enclosure is formed of material that is capable of withstanding heat and is of a fabric nature with a flap configuration for its openings so that once the item is placed inside the flap is closed thus containing the device within. Additionally, a pair of fire resistant and heat temperature gloves are provided for allowing the individual to grasp and insert the device within the flexible fabric pouch.

There is, therefore, a need for a safe and secure sealing retainment retention system for small intense fires that occur in such portable electronic equipment such as laptop computers, cell phones, MP3 players, or the like utilizing battery as their primary power source.

SUMMARY OF THE INVENTION

A fire containment case for selectively receiving and securing a portable electronic device and their batteries in the event of fire. The case provides an easy access airtight sealing closure for receipt and containment of the device. The case being of heat resistance construction to contain and control products of combustion from a device so involved. An integrated filter canister and optional vacuum canister in communication with the case equipment receiving interior absorbs and contains combustion fumes and gases. Case containment insulation can be of both an active thermal insulation and/or passive to maintain case integrity. External temperature gauge and fire suppression may be provided with external access fittings, pressure gauge and gas vents if necessary.

DETAILED DESCRIPTION OF THE INVENTION

Figure 1:
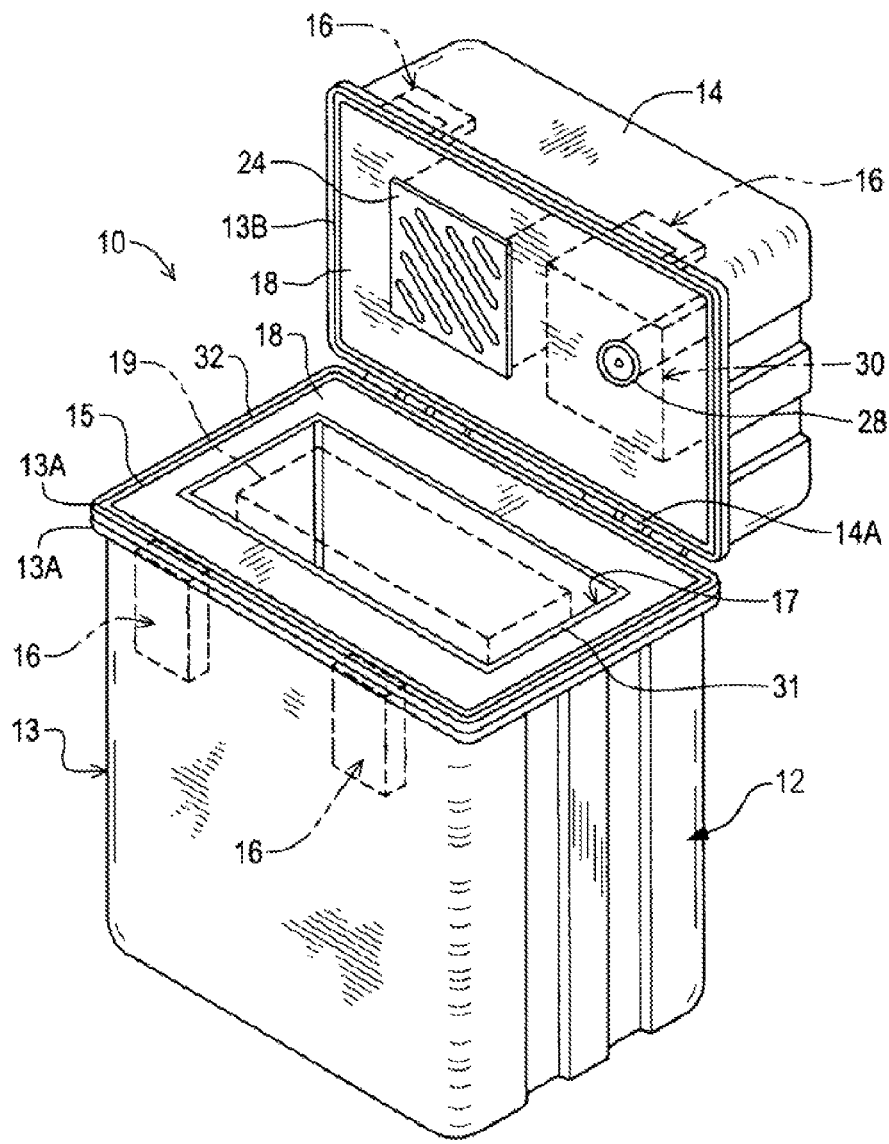
FIG. 1 is a graphic perspective view of the primary containment case of the invention.

Referring now to FIG. 1 of the drawings, a fire containment case 10 of the invention can be seen for receiving electronic equipment (not shown) that is on fire. The containment case 10 has a main exterior housing 12 defined of a base portion 13 and a hinge closure portion 14 having hinge assemblies 14A. The exterior housing 12 is preferably of a rectangular configuration of a known size and dimension to accommodate and receive a variety of portable electronic equipment therewithin. An airtight sealing gasket configuration 15 is provided and formed by the respective perimeter engagement flanges 13A and 13B of the base and closure portions 13 and 14 as will be well understood by those skilled in the art.

A common latch system 16 assures closure portion 14 retainment and secures the housing 12 with a sealing gasket assembly 15 and will be described in greater detail with alternate forms hereinafter.

Figure 5:
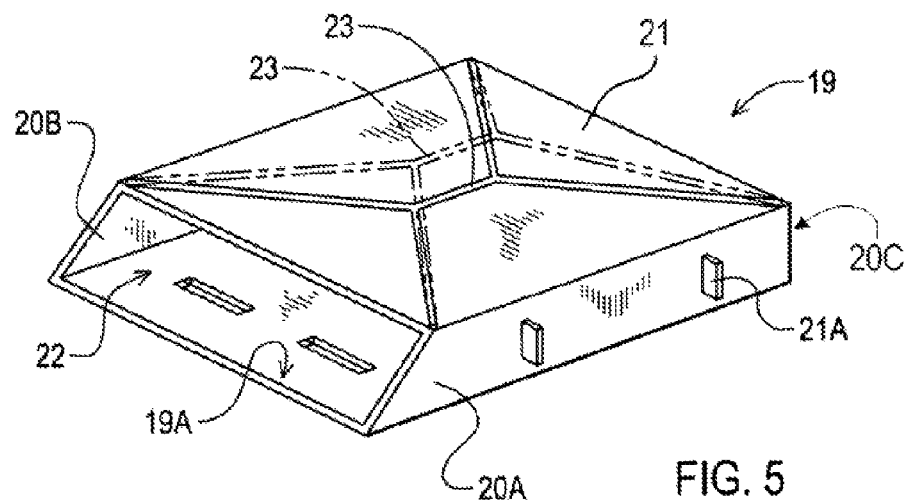
FIG. 5 is a perspective view of an equipment transport container.

In the primary form of the invention, an internal equipment receiving case 17 is formed within the exterior case housing 12 of the case 10 with thermal flame retardant insulation 18 infilling between the internal receiving case 17 and the exterior housing 12. An equipment receiving and transportation container 19, as best seen in FIG. 5 of the drawings is generally of a rectangular configuration having a receiving base panel 19A with upstanding interconnected side and end walls 20A and 20B and 20C respectively. An integral top panel 21 forms an equipment transport receiving area 22 therewithin. The sidewalls 20A and 20B are tapered at their respective opening defined by the enclosure forming in essence a side edge scoop therein. A collapsible wire handle assembly 23 is secured to the top panel 21 which will allow for user's grasp and lifting for engaging and receiving electronic equipment while on fire. The transportation container 19 is of an overall dimension less than that of the receiving case 17 with optional spacer tabs 21A extending from the exterior of the side wall 20A so as to be slidably received therewithin and spaced same associate to the interior thereof as illustrated in solid and broken lines in FIG. 2 of the drawings.

Figure 2:
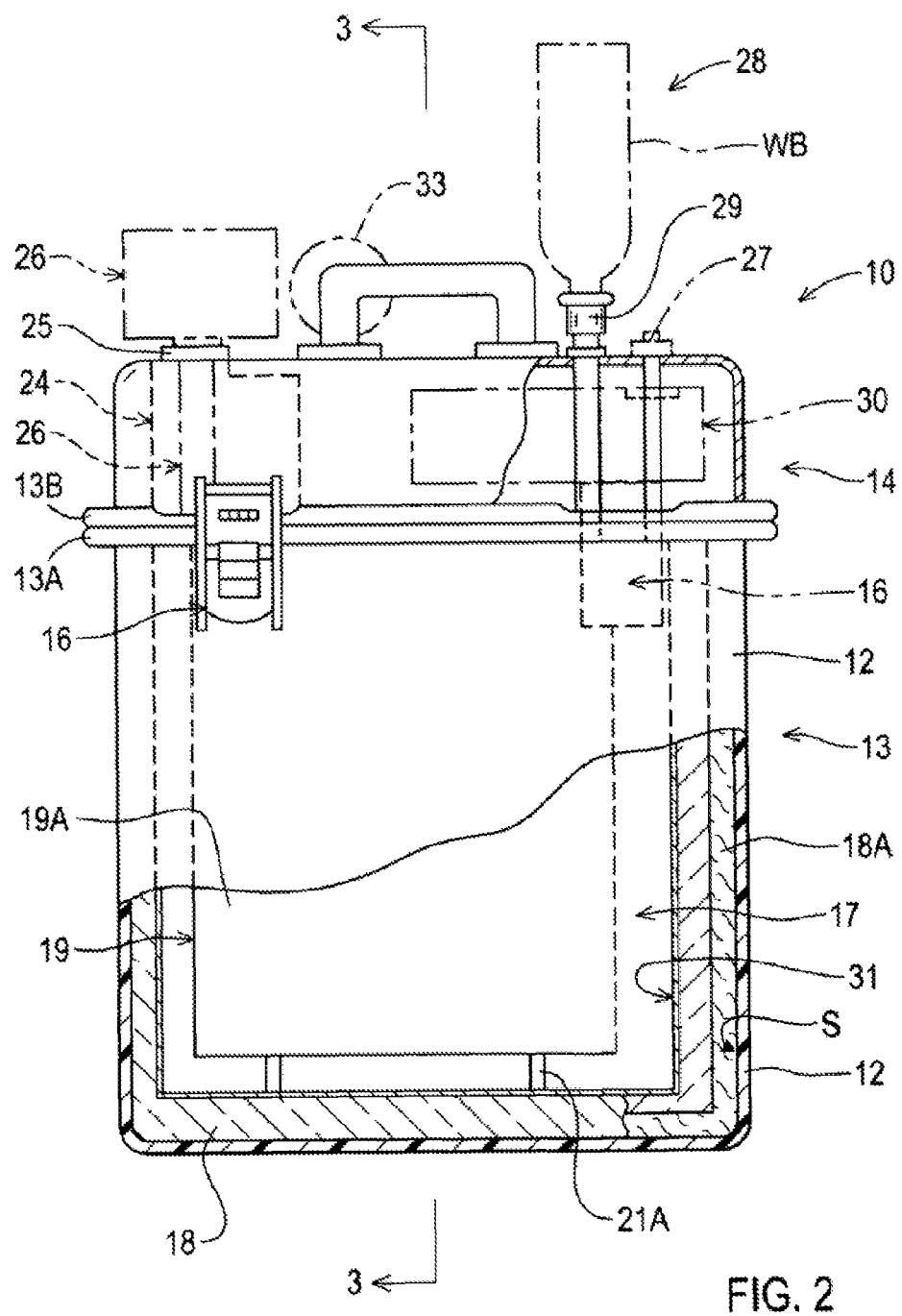
FIG. 2 is a front elevational and partial sectional view of the containment case construction showing alternate features associated therewith in broken lines.
Figure 3:
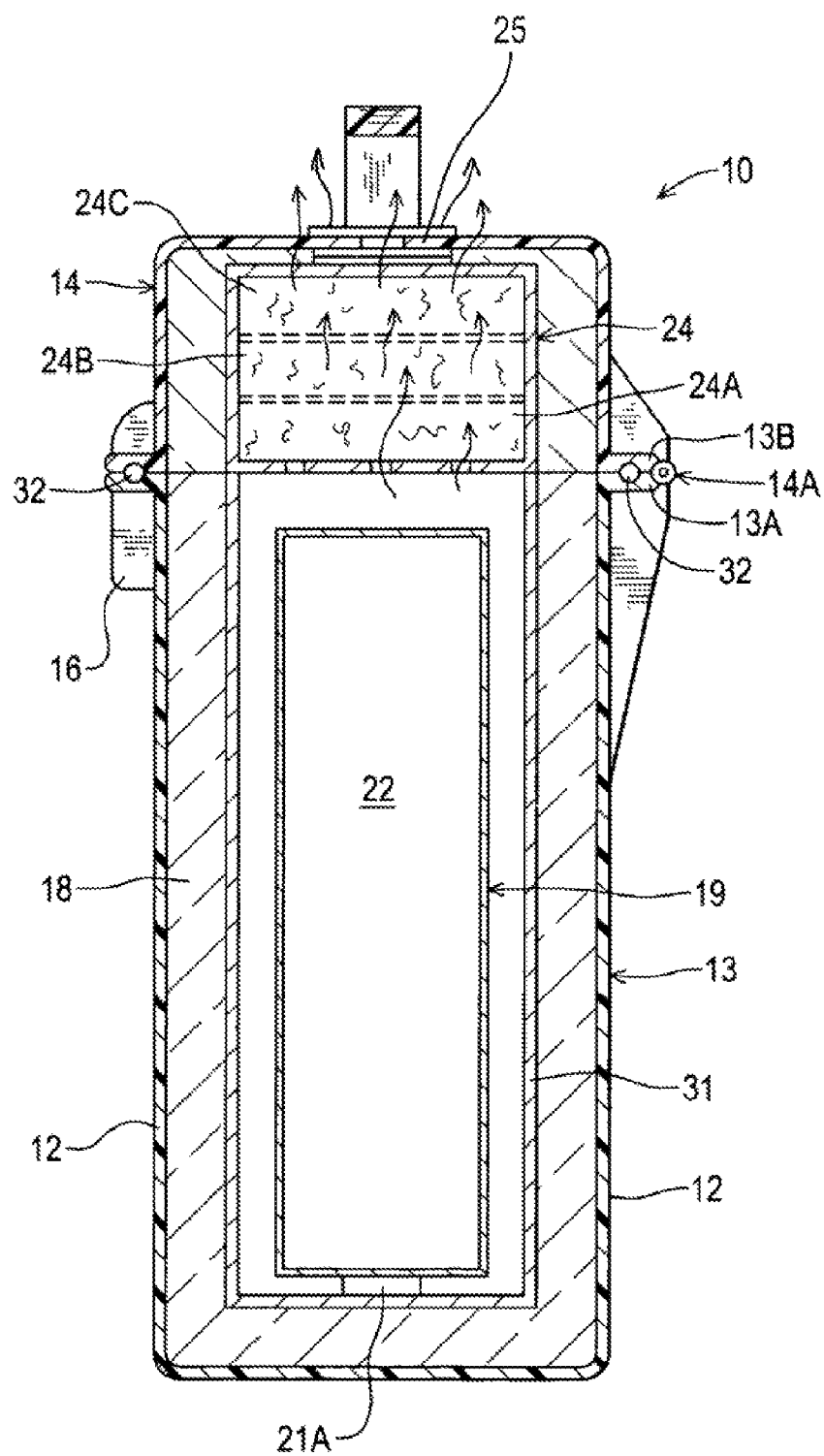
FIG. 3 is a section on lines 3-3 of FIG. 2.
Figure 4:
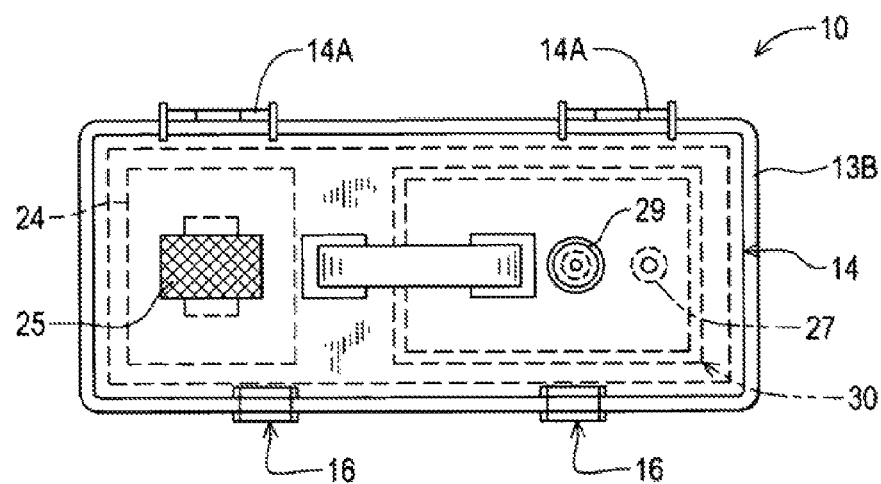
FIG. 4 is a top plan view thereof.

The thermal insulation 18 hereinbefore described may be of a passive static material chosen from a variety of thermal insulation materials currently available commercially or alternately of an active thermal material 18A as illustrated in FIG. 2 of the drawings. Such an active thermal insulation material has a phase charged change material based on inorganic salts that absorb heat and therefore help maintain the outer case temperature of the containment case housing 12. Such phase change insulation materials are commercially marketed, for example, by PCM Energy Ltd.

The containment case 10 of the invention has a gas and fume collection filter and retainment system 24 in communication with the interior of the internal equipment receiving case 17. The gas and fume system 24 in this example is positioned in the hinge insulated closure portion 14 and may have multiple filter zones including, for example, an initial particle filter 24A, a gas fume filter 24B and an optional chemical zone filter 24C to collect and retain dangerous gases such as carbon monoxide and cyanide that may result from the burning of synthetic resin based materials during combustion. The filter system 24 then vents treated gases to atmosphere at 25.

The addition of an evacuation gas canister 26 may be used as an alternate to the filter under negative pressure to collect the gases expelled by the burning electronic devices, not shown, sealed within the equipment receiving case 17 within the containment case 10 as illustrated in broken lines in FIG. 2 of the drawings as an alternate gas collection system.

Given the varied nature of fire control and extinguish materials available, an optional valve fitting 27 is provided allowing for direct communication with the equipment receiving chamber 17 affording the selective input of such fire fighting materials as Halon, flame retardant foam from an outside supply source through valve fitting 27 thereby filling the case 17 receiving area and displacing gas combustion products via the hereinbefore described venting filters.

An auxiliary fire suppression system 28 can be seen in FIG. 2 of the drawings having a water injection fitting 29 extending through the insulated closure portion 14 of the case 10 in communication with the equipment receiving case 17. A water bottle WB, shown in broken lines can therefore be attached to the water injection fitting 29 and manually expelled by manual compression into the case 17.

As an additional alternate fire suppression venue, an alternate canister dispenser 30 of thermal insulating fire retardant foam that would be activated once the case is closed during active use in the presence of burning equipment positioned therewithin. Such firefighting foam is released into the respective equipment receiving case 17 to effectively control gases and temperature and extinguish the fire and is illustrated in broken lines as an alternate suppression system in FIG. 2 of the drawings in the closure portion 14.

As noted, the alternate containment case 10 insulation 18A can be seen in a portion of FIG. 2 of the drawings which illustrates, as noted, the positioning of the thermal phase change material insulation 18A against the inside surface S of the exterior housing 12 with a layer of conventional flame proof insulation 18B. Additionally, a flame proof liner 31 surrounds the interior receiving chamber defined by the case 17.

The sealing gasket assembly 15 is defined by the pair of elongated contoured continuous integrated engagement flanges 13A and 14A extending respectively about the open end edges of the base portion 13 and closure portion 14, as noted. In this example, an O-ring gasket 32 is fitted within a channel therein and provides an airtight seal therebetween when engaged and secured by the latch assembly 16, as noted. It will be evident to those skilled in the art that an alternate sealing gasket material can be used, such as a graphite material gasket well within the doctrine of the art. The latch system 16 of the case 10 being identified as a so-called butterfly twist catch latches to maintain an airtight pressure tight seal between the closure 14 and the base portion 13, as described. The case housing 12 construction is preferably defined as heat resistant synthetic resin as wherein an interior wall of the retainment case 17 is of preferably aluminum material with an increase interior and exterior dimensions respectively over that of the primary dimension formed so as hereinbefore described as to be sufficient to receive and hold electronic equipment in question.

The addition of a digital temperature gauge 33 to indicate the internal temperature of the case 17 for confirmation as to the status and removal of the combustion contents may be provided as shown in broken lines in the closure portion 14.

It will be evident from the above description that other fire containment and extinguishing systems may also be enabled within the parameters of the containment case configuration of the invention.

In any such device fires, it would be self-evident that the possibility of the battery (not shown) within the electronic equipment (not shown) could be removed within the scope of one skilled in the art and independently contained within the containment case 17 configuration for the invention as hereinbefore described. The isolation of the battery independent of the device, if possible, provides a more direct fire containment parameter and would, as noted, be only available in certain situations or in battery condition events of impending combustion which could cover a wide range of potential combustible events.

It will thus be seen that a new and novel fire containment case for portable electronic equipment has been illustrated and described and it will be apparent to those skilled within the art that various changes and modifications may be made therein without departing from the spirit of the invention.

Therefore I claim:

1. A fire containment case for portable electronic devices on fire comprising,
a fireproof portable container including a thermally insulated closure portion, an interconnected a base portion, an airtight sealing gasket positioned therebetween, a thermally insulated equipment receiving case within said base portion, wherein said closure portion provides a minimized opening in a width dimension of the case which is less than length and depth dimensions of said case for access to the insulated receiving case,
an interdependent multiple stage gas filter having a multiple interconnected separate filter media retainment chambers disposed in the closure portion in gas flow communication with said equipment receiving case and a vent in gas flow communication with the multiple stage gas filter and atmosphere external to the case, an open portable equipment receiving and transportation container registerably received within said insulated equipment receiving case, an exterior quick connect fluid container receiving fitting in direct communication with said insulated receiving case, and said portable equipment receiving and transportation container therewithin.

2. The fire containment case for portable electronic devices on fire set forth in claim 1 wherein said insulated equipment receiving case has said thermal insulation material there around in said base portion of said containment case and around said multiple stage gas filter.

3. The fire containment case for portable electronic devices on fire set forth in claim 1 wherein said open portable equipment receiving and transport container comprises, a metal enclosure, with at least one deployable handle assembly on said enclosure.

4. The fire containment case for portable electronic devices on fire set forth in claim 1 wherein said multiple stage gas filter and said fluid receiving fitting is positioned within said thermal insulated closure portion.

5. The fire containment case for portable electronic devices on fire set forth in claim 1 wherein said gas multiple stage filter has at least two media chambers that include but are not limited to a particulate filter, a charcoal filter and a chemical filter for toxic gases therewithin in communication with one another and said equipment receiving case and atmosphere.

6. The fire containment case for portable electronic devices on fire set forth in claim 1 wherein said exterior quick connect fluid receiving fitting is adapted for a non-pressurized portable fluid container to be discharged therethrough.

7. The fire containment case for portable electronic devices on fire set forth in claim 1 wherein said fire containment case has an interior temperature probe visible from outside said case when closed.

8. A fire containment case for safely handling portable electronic devices that have ignited comprising,
a fireproof portable container including a thermally insulated closure portion, an interconnected base portion, an airtight sealing gasket positioned therebetween, a thermally insulated equipment receiving case within said base portion, wherein the closure portion provides a minimized opening in a width dimension of the case which is less than length and depth dimensions of said case for access to the insulated receiving case,
an interdependent multiple stage gas filter having multiple interconnected separate filter media retainment chambers disposed in the closure portion in gas flow communication with said equipment receiving case and a vent in gas flow communication with the multiple stage gas filter and atmosphere external to the case, wherein said media retainment chambers include at least a chamber for particulate matter and a chamber for fumes, an exterior quick connect fluid container receiving fitting in direct communication with said insulated receiving case.

9. The fire containment case of claim 8, further comprising an auxiliary fire suppression system disposed in the closure portion of the case.

10. The fire containment case of claim 8, further comprising an equipment transport scoop for collecting ignited portable electronic equipment for safely inserting the ignited portable electronic equipment and inserting the electronic equipment into the thermally insulated equipment receiving case within said base portion.

11. The fire containment case of claim 10, wherein the transport scoop further comprises a metal enclosure with at least one deployable handle assembly on said enclosure.

12. The fire containment case of claim 8, wherein said exterior quick connect fluid receiving fitting is adapted for a non-pressurized portable fluid container to be discharged therethrough.

13. The fire containment case of claim 8, wherein said insulated equipment receiving case has said thermal insulation material there around in said base portion of said containment case and around said multiple stage gas filter.

14. The fire containment case of claim 8, wherein said gas multiple stage filter further comprises a particular filter and a charcoal filter for toxic gases therewithin in communication with one another and said equipment receiving case and atmosphere.

* * * * *